Figure 1:
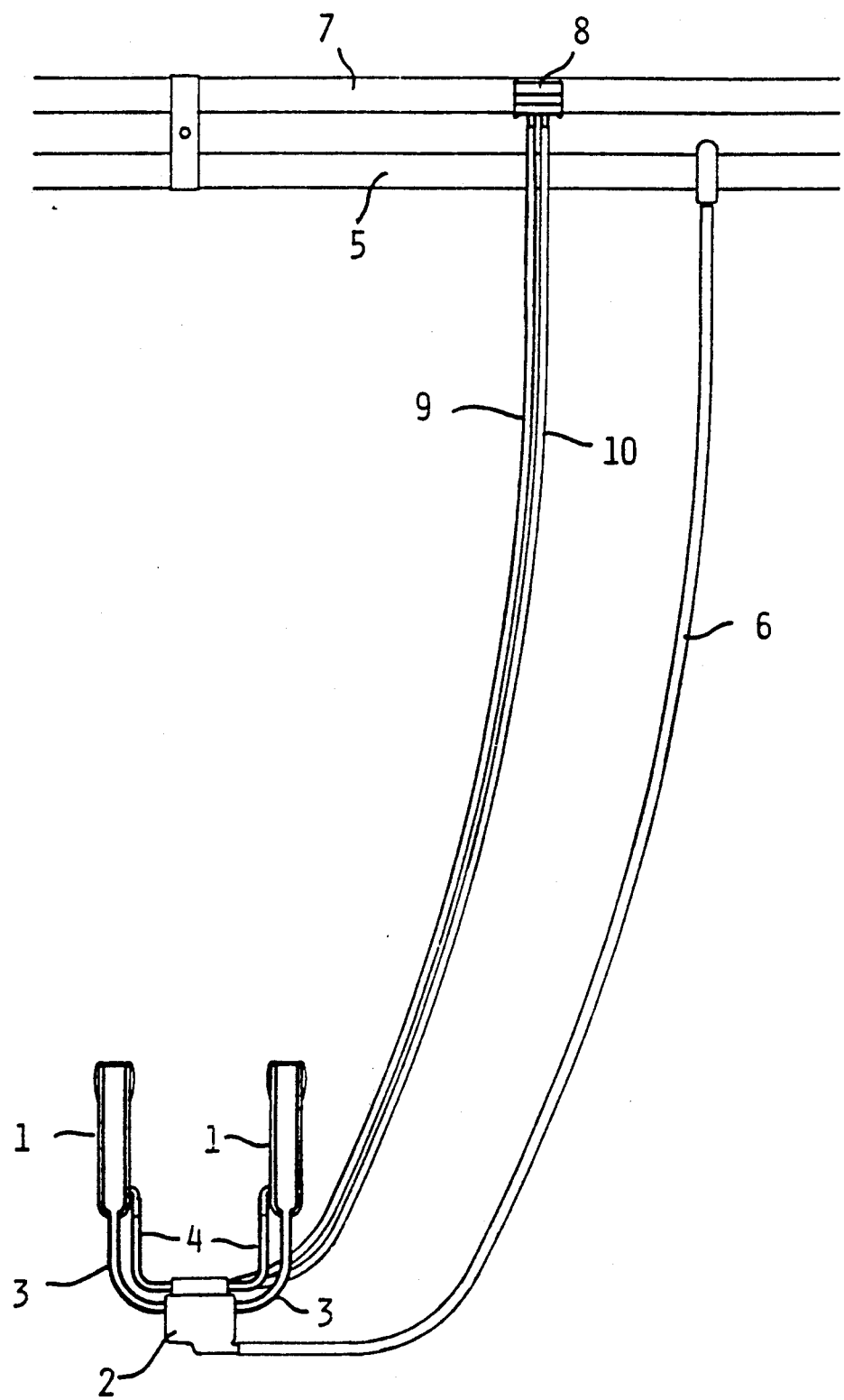

United States Patent [19]
Kristoffer

[11] Patent Number: 5,255,628
[45] Date of Patent: Oct. 26, 1993

[54] MILKING PULSATOR

[75] Inventor: Olofsson H. Kristoffer, Huddinge, Sweden

[73] Assignee: Alfa-Laval Agriculture International AB, Tumba, Sweden

[21] Appl. No.: 938,125
[22] PCT Filed: May 21, 1991
[86] PCT No.: PCT/SE91/00360
§ 371 Date: Oct. 15, 1992
§ 102(e) Date: Oct. 15, 1992
[87] PCT Pub. No.: WO91/18500
PCT Pub. Date: Dec. 12, 1991

[30] Foreign Application Priority Data
May 31, 1990 [SE] Sweden ................................ 9001953

[51] Int. Cl.⁵ .......................... A01J 3/00; F16K 31/00
[52] U.S. Cl. .................................. 119/14.15; 251/901; 137/596.17
[58] Field of Search ............... 119/14.01, 14.02, 14.08, 119/14.15, 14.24, 14.27, 14.28, 14.29, 14.32; 251/901; 137/596.17, 870

[56] References Cited
U.S. PATENT DOCUMENTS
2,545,857 3/1951 Perkins et al. .................... 119/14.08
3,771,563 11/1973 Hayner ............................ 251/901 X
3,931,794 1/1976 Chillingworth ................... 119/14.08
4,450,864 5/1984 Huckebrink ..................... 137/624.13

OTHER PUBLICATIONS
WO82/01924; Design & Technology Services Pty, Ltd.

Primary Examiner—Gene Mancene
Assistant Examiner—Thomas Price
Attorney, Agent, or Firm—Hovey, Williams, Timmons & Collins

[57] ABSTRACT

A milking pulsator comprises a housing, forming a chamber, in which a vacuum passage opens via a first opening. A pulsation channel to be connected to at least one teat cup communicates with the chamber and with atmosphere via a second opening. Valve means are arranged to close and open said first and second openings. Each valve means comprises a membrane, and a pivoted member, the membrane being attached between the pivoted member and the housing. The pivoted members are journalled in the housing for pivotal motion back and forth between closing positions, at which said openings are covered by the membranes of the valve means, and opening positions, at which said openings are uncovered. In addition, adjustment means are adapted to adjust the pivoted members of the valve means such that the first opening is closed when the second opening is uncovered and vice versa.

11 Claims, 4 Drawing Sheets

MILKING PULSATOR

The present invention relates to a milking pulsator for alternate connection of a source of vacuum to a number of teat cups. The milking pulsator comprises a housing forming a chamber, a vacuum passage to be connected to said source of vacuum and opening into the chamber via a first opening, and a pulsation channel to be connected to at least one of said teat cups and communicating with the chamber and with atmosphere via a second opening. The chamber is provided with a first vale means to close and open said first opening, and a second valve means to close and open said second opening. Means is provided for adjusting each valve means between an opened position and a closed position.

A milking pulsator of this kind is known from U.S. Pat. No. 4,450,864. The known milking pulsator has its first and second valve means assembled into one single valve body with double valve cones connected to the housing via a membrane. The adjustment of the valve body is provided by alternately applying a pressure difference over the membrane by means of a slide valve controlled by a double acting solenoid. The current supply of the solenoid can be provided by for instance a rechargeable battery, which is relatively large in size because of the required power capacity. Thus, the membrane and the slide valve constitute components in a servo system, by means of which the required current consumption for adjusting the valve body can be kept relatively low. In comparison with the entirely pneumatically operated milking pulsators currently available in the market, the known electrically operated milking pulsator has the advantage that its rate and pulsation ratio can be maintained substantially constant during a long period of operation.

However, the known electrically operated milking pulsator has the drawback that it is substantially more expensive than said pneumatically operated milking pulsators. In addition, the necessary conduits between a current source, for instance a battery, and the known milking pulsator mean the existence of contacts. Such contacts can easily corrode because of the damp environment, whereby the function of the milking pulsator is jeopardized.

The object of the present invention is to provide a new milking pulsator, which is inexpensive and can be operated during a long period of time in a constant rate and pulsation ratio. A further object of the present invention is to provide a new electrically powered milking pulsator enabling use of batteries small enough to be encapsulated in the milking pulsator, whereby corrosion sensitive contacts outside the milking pulsator are avoided.

These objects are obtained by means of a milking pulsator of the kind initially described, which mainly is characterized in that each valve means comprises an elongated flexible membrane with two ends, one of which is attached to the housing, and a pivoted member, to which the other end of the membrane is attached. Said pivoted members of the first and second valve means are journalled in the housing for pivotal motion back and forth between closing positions, at which said first and second openings are covered by the membrane of the first valve means and the membrane of the second valve means, respectively, and opening positions, at which said openings are uncovered from the membranes. Said adjustment means is adapted to adjust the pivoted members of the first and second valve means, such that the first opening is closed when the second opening is uncovered and vice versa.

In consequence, the new milking pulsator will have the advantages that it will be inexpensive, since no servo system is needed to adjust the valve means; it can be operated electrically, for instance by means of a stepping motor, whereby a constant rate and pulsation ratio easily can be maintained during operation; and, in spite of the lack of a servo system, it will be low power consuming, since an extremely small force is sufficient to provide a membrane to roll off an opening of a channel, in which vacuum prevails. Membrane valves of the kind in question are described in WO 82/01924.

Suitably, the pivoted members of the first and second valve means are attached to a common shaft. By this said adjustment means can comprise one single motor for tuning said common shaft back and forth.

When milking cows usually one of two different types of pulsation systems is used, namely either a type of pulsation system, in which all of the cow's four teats are milked simultaneously during each pulsation cycle, or another type of pulsation system, in which two pairs of the cow's teats are milked alternately, so that one pair of teats is milked simultaneously during a first pulsation cycle, whereas the other pair of teats is milked simultaneously during a second pulsation cycle, which is offset in phase relative to the first pulsation cycle. Usually each pulsation cycle has a duration of about one second. Since the new milking pulsator primarily is intended to be used for said alternate milking of a cow's four teats, it is preferred that said pulsation channel is adapted to be connected to two of the teat cups, the housing forming a further chamber, into which a further vacuum passage to be connected to said source of vacuum opens via a third opening, and a further pulsation channel to be connected to the two other teat cups and communicating with said further chamber and with atmosphere via a fourth opening. In addition to this, a third valve means is arranged in said further chamber to close and open said third opening, and a fourth valve means is arranged to close and open said fourth opening. Said third and fourth valve means is of identical construction as that of the first and second valve means. Said adjustment means is adapted to adjust the pivoted members of the third and fourth valve means, such that the third opening is closed when the fourth opening is uncovered and vice versa.

Suitably, the pivoted members of the first and second valve means are attached to a common shaft, and the pivoted members of the third and fourth valve means are attached to a further common shaft. Said adjustment means comprises a separate motor for turning said common shaft back and forth, and a further separate motor for turning said further common shaft back and forth.

As an alternative, all of the pivoted members of the valve means may be attached to a common shaft, whereby said adjustment means only needs to have on single motor for turning said one common shaft back and forth.

In the new milking pulsator flow channels are formed between the pivoted members of the valve means and the housing. Preferably, the pivoted member of at least one of the valve means is provided with an entrainment member, which is arranged such that it extends into and is displaced in the flow channel between the pivoted member and the housing during at least a substantial part of the turning of the pivoted member between said closing and opening positions. In consequence, the entrainment member is influenced by air flowing through the flow channel, as the membrane of the valve means uncovers its opening, and entrains the pivoted member towards the opening position of the valve means. Thus, the source of vacuum connected to the milking pulsator is utilized partly to operate the milking pulsator, which results in a reduced need for electrical energy for the operation of the milking pulsator.

Suitably, each pivoted member is provided with said entrainment member, which minimizes the need for electrical energy for the operation of the milking pulsator.

The need for electrical energy for the operation of the new milking pulsator may be further reduced by connecting each pivoted member provided with said entrainment member to an electro-magnetic stepping motor for said turning of the pivoted member. In addition to this the electro-magnetic stepping motor is connected to an electric accumulator via a control means, which is adapted to activate the electro-magnetic stepping motor for displacing the membrane of the pivoted member from said closing position, such that the membrane at least is displaced to the extent that the membrane starts uncover the opening associated with the membrane. Said control means is also adapted to control the electro-magnetic stepping motor, such that the latter operates as a generator for charging the electric accumulator during the entrainment of the pivoted member by the entrainment member. If each pivoted member would be provided with an entrainment member and arranged in the manner described above with an electro-magnetic stepping motor and an electric accumulator, the new milking pulsator could be totally self-driving, provided that energy enough from the source of vacuum could be transformed to the electrical energy required for complete operation of the milking pulsator.

The new milking pulsator is primarily intended to subject the pulsation space in each teat cup to a pressure which pulsates between vacuum and atmospheric pressure during operation. However, it would of course be fully possible to modify the new milking pulsator for connection also to a source of overpressure, so that during operation the milking pulsator subjects each pulsation space to a pressure which pulsates between vacuum and overpressure without changing the principal function of the milking pulsator according to the invention.

Figure 3:
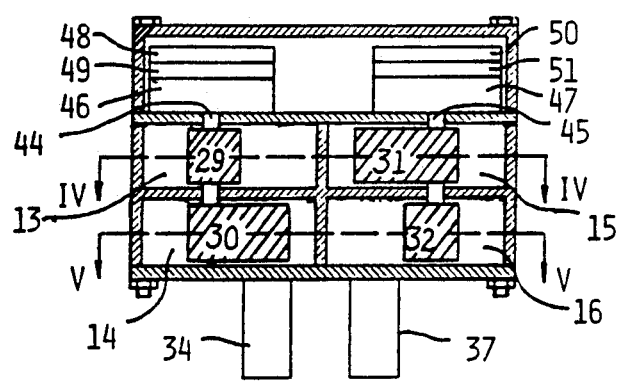
Figure 2:
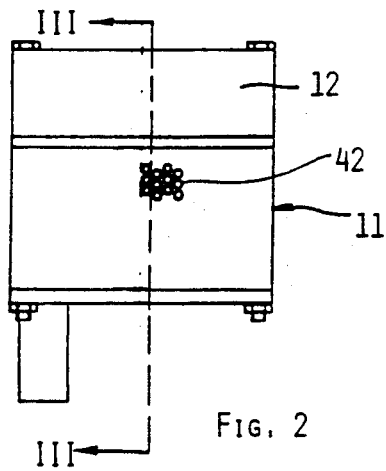
Figure 4A:
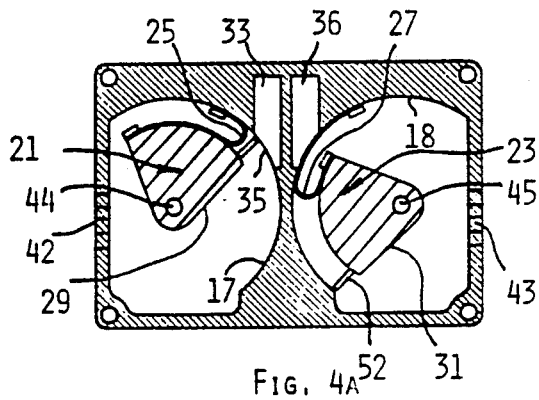
Figure 5A:
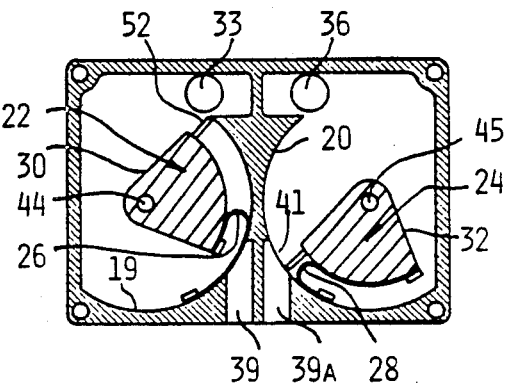
Figure 4B:
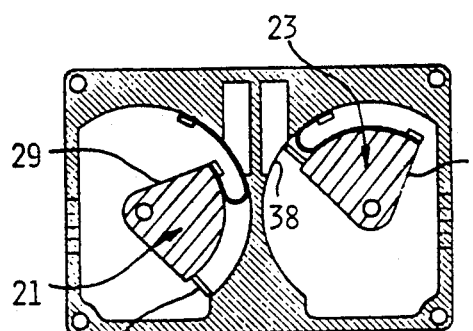
Figure 5B:
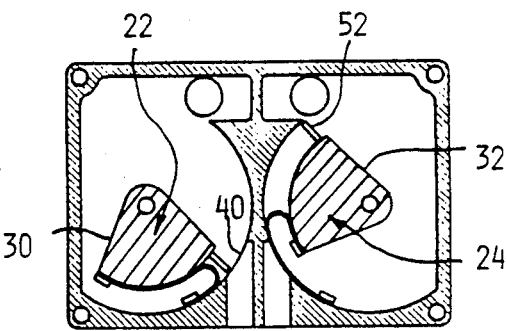
Figure 6:
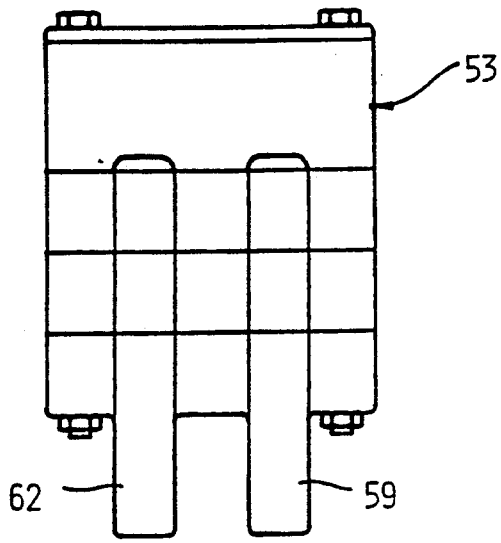
Figure 7:
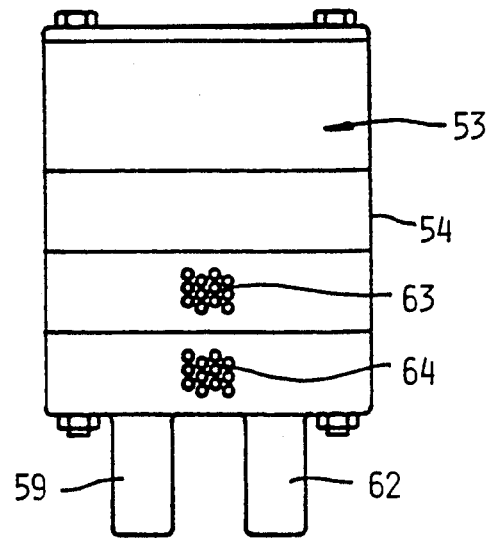
Figure 8:
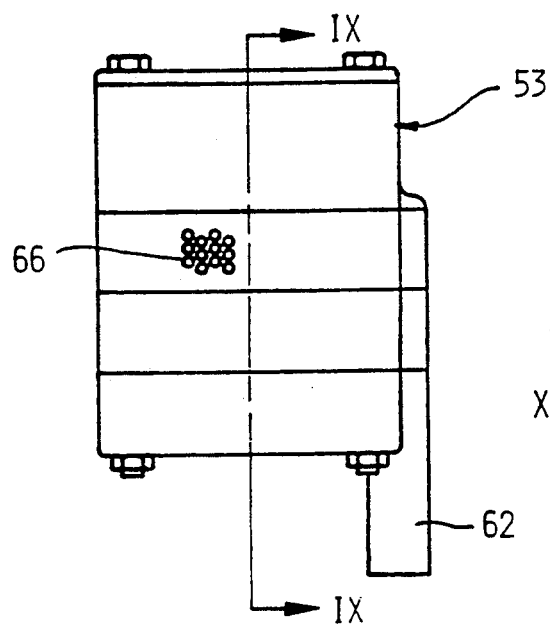
Figure 9:
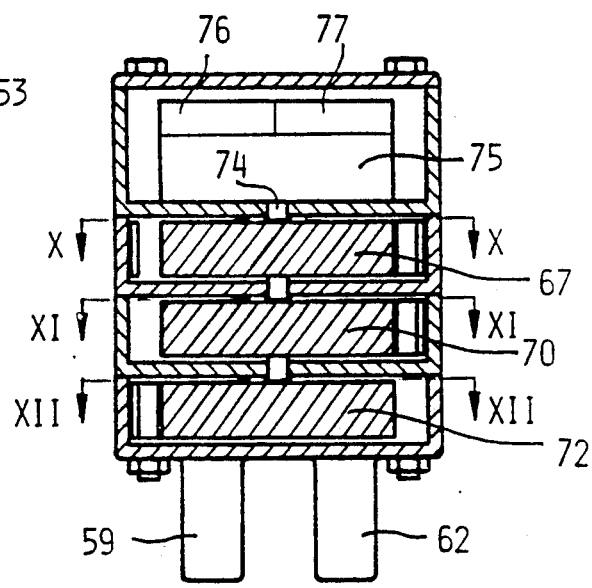
Figure 10A:
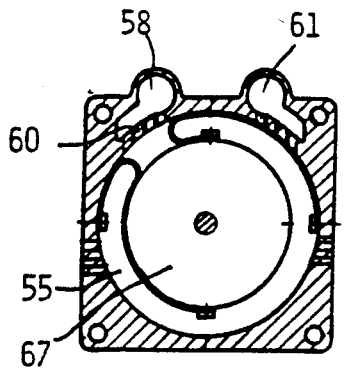
Figure 10B:
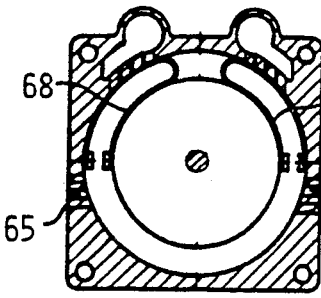
Figure 10C:
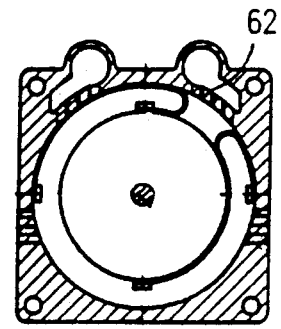
Figure 11A:
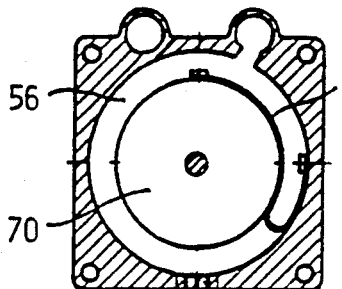
Figure 12A:
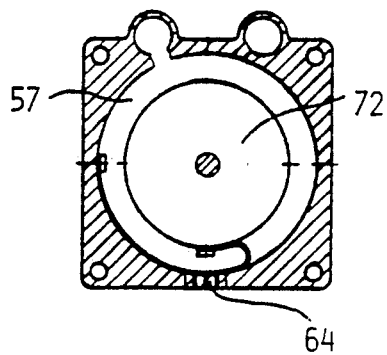

The invention is described more closely in the following with reference to the accompanying drawing, in which FIG. 1 shows a milking plant with a milking pulsator according to the invention, FIG. 2 shows an embodiment of the milking pulsator according to the invention, FIG. 3 shows a section along the line III—III in FIG. 2, FIGS. 4a and 5a show sections along the lines IV—IV and V—V, respectively, in FIG. 3, FIGS. 4b and 5b show the same sections as that of FIGS. 4a and 5a, respectively, but with other adjustments of the valve means of the milking pulsator, FIGS. 6, 7 and 8 show side views of another embodiment of the milking pulsator according to the invention, FIG. 9 shows a section along the line IX—IX in FIG. 8, FIG. 10a, 11a and 12a show sectional views along the lines X—X, XI—XI and XII—XII, respectively, in FIG. 9, and FIGS. 10b and 10c; 11b and 11c; and 12b and 12c show the same views as that of FIGS. 10a, 11a and 12a, respectively, but with other adjustments of the valve means of the milking pulsator.

The milking plant shown in FIG. 1 has four teat cups 1 with teat cup liners, a teat cup claw 2, to which the teat cups 1 are connected via four short milk tubes 3 and four short pulsation tubes 4, a milk transport conduit 5, which is connected to the claw 2 via a long milk tube 6, and a vacuum conduit 7, to which a milking pulsator 8 according to the invention is connected. Two long pulsation tubes 9, 10 extend between the milking pulsator 8 and the claw 2, and are connected to two pairs of the teat cups 1, respectively, via the claw 2 and the four short pulsation tubes 4.

The milking pulsator 11 shown in FIGS. 2-5 comprises a housing 12, which has four valve chambers 13-16 with part cylindrical wall surfaces 17-20. In the valve chambers 13-16 there are valve means 21-24, respectively, comprising elongated membranes 25-28 and sector shaped pivoted members 29-32. Each valve means has one end of its membrane attached to the sector shaped pivoted member of the valve means, whereas the other end of the membrane of the valve means is attached to the housing, the membrane being extended a distance along the convex surface of the sector shaped pivoted member, being bent 180° from this to the wall of the valve chamber and being extended a distance along the part cylindrical surface of the valve chamber.

A pulsation channel 33 extends from a nipple 34 via the valve chamber 14 through the housing 12 and opens into the valve chamber 13 via an opening 35 in the part cylindrical surface 17. A further pulsation channel 36 extends from a nipple 37 via the valve chamber 16 through the housing 12 and opens into the valve chamber 15 via an opening 38 in the part cylindrical surface 18. Two vacuum passages 39 and 39a extend through the housing 12 and open into the valve chambers 14 and 16 via openings 40 and 41, respectively. The membrane 25-28 are arranged to cover and uncover the openings 35, 38, 40 and 41, respectively. The valve chambers 13 and 15 communicate with atmosphere via passages 42 and 43, respectively.

The pivoted members 29 and 30 are attached to a shaft 44, which is journalled in the housing 12 and which is turnable 90° between a first end position, at which the opening 35 is uncovered, while the opening 40 is covered by the membrane 26, and a second end position, at which the opening 35 is covered by the membrane 25, while the opening 40 is uncovered. Correspondingly, the pivoted members 31 and 32 are attached to a shaft 45, which is journalled in the housing 12 and which is turnable 90° between a first end position, at which the opening 38 is covered by the membrane 27, while the opening 41 is uncovered, and a second end position, at which the opening 38 is uncovered, while the opening 41 is covered by the membrane 28.

Two electro-magnetic stepping motors 46, 47 are connected to the shafts 44, 45, respectively, to turn these back and forth between said end positions. An electric accumulator 48 is connected to the stepping motor 46 via a control means 49 and an electric accumulator 50 is connected to the stepping motor 47 via a control means 51.

Each pivoted member is provided with a wing 52, which extends radially outwards from the convex surface of the pivoted member towards the part cylindrical wall surface of the valve chamber. Each wing 52 is located at one corner of the convex surface of the pivoted member of the wing 52, so that the membrane of the pivoted member abuts against the convex surface of the pivoted member at the opening position of the pivoted member without being obstructed by the wing 52.

During milking the milking pulsator 11 operates in the following manner:

Initially the milking pulsator 11 is attached to the vacuum conduit 7, the vacuum channels 39, 39a being connected to the interior of the vacuum conduit 7. The pulsation tubes 9, 10 are connected to the nipples 34 and 37, respectively. In the positions of the valve means 21-24 shown in FIGS. 4a and 5a atmosphere communicates with the interior of the pulsation tube 9 via the passage 42, the valve chamber 13, the pulsation channel 33 and the interior of the nipple 34, while the interior of the vacuum conduit 7 communicates with the interior of the pulsation tube 10 via the vacuum channel 39a, the valve chamber 16, the pulsation channel 36 and the interior of the nipple 37.

When the pressure conditions in the pulsation tubes 9, 10 are to be alternated the control means 49 first activates the stepping motor 46 by a pulse of current from the electric accumulator 48, so that the shaft 44 is turned clockwise at least as much such that the membrane 26 starts to uncover the opening 40. In consequence the space between the part cylindrical wall surface 19, the wing 52 of the pivoted member 30, the convex surface of the pivoted member 30 and the membrane 26 is evacuated, so that the resulted pressure difference across the wing 52 of the pivoted member 30 causes the latter to entrain the pivoted member 30 to the position shown in FIG. 5b, the pivoted member 29 also being turned to the position shown in FIG. 4b. Soon thereafter the control means 51 activates the stepping motor 47 by a pulse of current from the electric accumulator 50, so that the shaft 45 is turned clockwise at least as much such that the membrane 27 starts to uncover the opening 38. In the same manner as described above in connection with the entrainment of the pivoted member 30, the pivoted member 31 is entrained by its wing 52 to the position shown in the FIG. 4b, the pivoted member 32 also being turned to the position shown in FIG. 5b.

During the entrainment of the pivoted members 30 and 31 the electro-magnetic stepping motors 46, 47 act as generators and charge the electric accumulators 48, 50 with electrical energy. Thus, pressure energy from the source of vacuum, which is connected to the vacuum conduit 7, is also transformed into electrical energy to operate the milking pulsator, so that this in principle can be totally operated by said source of vacuum.

With the valve means 21-24 in the positions shown in FIGS. 4b and 5b atmosphere communicates with the interior of the pulsation tube 10 via the passage 43, the valve chamber 15, the pulsation chamber 36 and the interior of the nipple 37, whereas the interior of the vacuum conduit 7 communicates with the interior of the pulsation tube 9 via the vacuum channel 39, the valve chamber 14, the pulsation channel 33 and the interior of the nipple 34. When the pressure conditions in the pulsation tubes 9, 10 are to be alternated again the control means 51 first activates the stepping motor 47 and soon thereafter the control means 49 activates the stepping motor 46, so that the pivoted members 29-32 are turned anti-clockwise back to the positions shown in FIGS. 4a and 5a. During each pulsation cycle the vacuum phase thus has a longer duration than the atmospheric phase.

The operation described above is repeated until the milking is finished.

The milking pulsator 53 shown in FIGS. 6-12 comprises a housing 54, which has three valve chambers 55-57 with circular cross-sections arranged coaxially. A pulsation channel 58, which extends from a nipple 59 through the housing 54, communicates with the valve chamber 57 and with the valve chamber 55 via a passage 60. A further pulsation channel 61, which extends from a nipple 62 through the housing 54, communicates with the valve chamber 56 and with the valve chamber 55 via a passage 62A. Two vacuum passages 63 and 64 extend through the housing 54 and open into the valve chambers 56 and 57, respectively. The valve chamber 55 communicates with atmosphere via two passages 65 and 66.

A first circular cylindrical pivoted member 67 is arranged in the valve chamber 55 coaxially with the latter and is provided with two elongated membranes 68 and 69 to open and close the passages 60 and 62A, respectively. A second circular cylindrical pivoted member 70 is arranged in the valve chamber 56 coaxially with the latter and is provided with an elongated membrane 71 to open and close the vacuum passage 63. A third circular cylindrical pivoted member 72 is arranged in the valve chamber 57 coaxially with the latter and is provided with an elongated membrane 73 to open and close the vacuum passage 64.

The pivoted members 67, 70 and 72 are attached to a shaft 74, which is journalled in the housing 54 and which is turnable 90° between a first end position (FIGS. 10a, 11a, 12a), at which the passages 60 and 63 are uncovered, while the passages 62A and 64 are covered by the membranes 69 and 73, respectively, and a transition position (FIGS. 10b, 11b, 12b) at which the passages 63 and 64 are uncovered, while the passages 60 and 62A are covered by the membranes 68 and 69, respectively. In addition to this the pivoted members 67, 70 and 72 are turnable 90° between said transition position and a second end position (FIGS. 10c, 11c, 12c), at which the passages 62 and 64 are uncovered, while the passages 60 and 63 are covered by the membranes 78 and 71, respectively.

An electro-magnetic stepping motor 75 is connected to the shaft 74 to turn this back and forth between said end positions. A battery 76 for driving the stepping motor 75 is connected to this via a control means 77.

The milking pulsator 53 operates in the following manner:

The milking pulsator 53 is attached to the vacuum conduit 7, the vacuum passages 63, 74 being connected to the interior of the vacuum conduit 7. The pulsation tubes 9, 10 are connected to the nipples 59 and 62A, respectively. In the positions of the pivoted members 67, 70, 72 shown in FIGS. 10a, 11a and 12a atmosphere communicates with the interior of the pulsation tube 9 via the passages 65 and 66, the valve chamber 55, the passage 60, the pulsation channel 58 and the interior of the nipple 59, whereas the interior of the vacuum conduit 7 communicates with the interior of the pulsation tube 10 via the vacuum passage 63, the valve chamber 56, the pulsation channel 61 and the interior of the nipple 62.

Figure 11B:
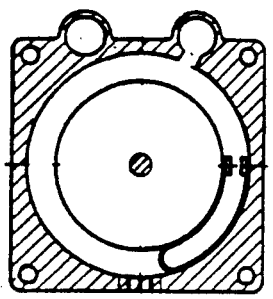
Figure 11C:
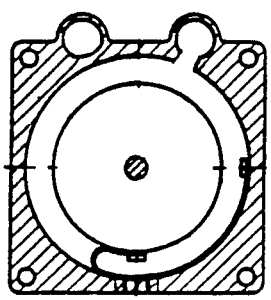
Figure 12B:
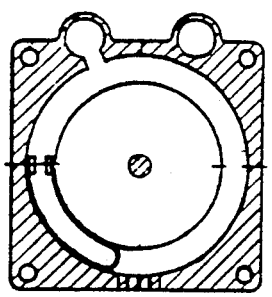
Figure 12C:
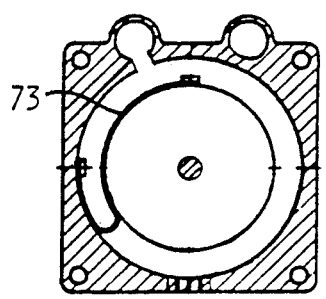

When the pressure conditions in the pulsation tubes 9, 10 are to be alternated the control means 77 activates the stepping motor 75 with current from the battery 76, so that the shaft 74 and the pivoted members 67, 70 and 72 first are turned clockwise 90° to said transition position according to the positions shown in FIGS. 10b, 11b and 12b, the interior of the vacuum conduit 7 communicating with the interior of the two pulsation tubes 9, 10. The pivoted members 67, 70 and 72 remain for a while in said transition position. This means that during each pulsation cycle the milking phase, i.e. when the teat cup liners in any of the pairs of teat cups are kept open because of exterior influence by the source of vacuum, will be longer than the rest phase, i.e. when said teat cup liners are kept closed because of influence by the pressure difference between atmospheric pressure acting externally on the teat cup liners and the milking vacuum prevailing in the interior of the teat cup liners. Soon thereafter the pivoted members 67, 70 and 72 are turned further 90° to the positions shown in FIGS. 10c, 11c and 12c. In these positions atmosphere communicates with the interior of the pulsation tube 10 via the passages 65 and 66, the valve chamber 55, the passage 62, the pulsation channel 61 and the interior of the nipple 62, whereas the interior of the vacuum conduit 7 communicates with the interior of the pulsation tube 9 via the vacuum passage 64, the valve chamber 57, the pulsation channel 58 and the interior of the nipple 59.

When the pressure conditions in the pulsation tubes 9, 10 are to be alternated again, the control means 77 activates the stepping motor 75, so that the pivoted members 67, 70 and 72 first are turned anti-clockwise 90° to said transition position and thereafter are turned further 90° to the positions shown in FIGS. 10a, 11a and 12a.

The above described operation of the milking pulsator 53 is repeated until the milking is finished.

The milking pulsator 53 may have a lower current consumption if the pivoted members 67, 70 and 72 are provided with wings analogous to the wings 52 in the above described milking pulsator 11. In addition to this the current consumption may be further reduced if the battery 76 is replaced by an electric accumulator, which is charged by means of the electro-magnetic stepping motor 75. Thus, this acts as an electric generator, when the pivoted members 67, 70 and 72 are entrained by said wings.

I claim:

1. A milking pulsator (11; 53) for alternate connection of a source of vacuum to a number of teat cups (1), comprising a housing (12;54), forming a first chamber (14;57), a vacuum passage (39;64) to be connected to said source of vacuum and opening into the first chamber via a first opening (40), a second chamber communicating with the atmosphere, and a pulsation channel (33;58) to be connected to at least one of said teat cups and communicating with the first chamber and with the second chamber via a second opening (35;60), a first valve means (22;72,74) in the first chamber to close and open said first opening, a second valve means (21;67,68) in the second chamber to close and open said second opening, and means (46,48,49;75-77) for adjusting each valve means between an open position and a closed position, characterized in that each valve means comprises an elongated flexible membrane (25,26;68,73) with two ends, one of which is attached to the housing (12;54), and a pivoted member (29,30;67,72), to which the other end of the membrane is attached, said pivoted members of the first and second valve means being journalled in the housing for pivotal motion back and forth between closing positions, at which said first and second openings (40 and 35;60) are covered by the membrane (26,73) of the first valve means and the membrane (25;68) of the second valve means, respectively, and opening positions, at which said openings are uncovered from the membranes, and that said adjustment means (46,48,49;75-77) is adapted to adjust the pivoted members (29,30;67,72) of the first and second valve means, such that the first opening (40) is closed when the second opening (35;60) is uncovered and vice versa.

2. A milking pulsator according to claim 1, characterized in that the pivoted members (29, 30; 67, 72) of the first and second valve means are attached to a common shaft (44; 74).

3. A milking pulsator according to claim 2, characterized in that said adjustment means comprises a motor (46; 75) for turning said common shaft (44; 74) back and forth.

4. A milking pulsator according to claim 1 for alternate connection of said source of vacuum to four teat cups (1), the pulsation channel (33;58) adapted to be connected to two of the teat cups, and the housing (12;54) further forming a third chamber (16;56), into which a further vacuum passage (39a;63) to be connected to said source of vacuum opens via a third opening (41), and a fourth chamber into which a pulsation channel (36;61) to be connected to the two other teat cups opens via a fourth opening (38;62A), said further pulsation channel communicating with the third chamber, said fourth chamber communicating with the atmosphere, the milking pulsator further comprising a third valve means (24;70,71) arranged in said third chamber to close and open said third opening, and a fourth valve means (23;67,69) arranged in said fourth chamber arranged to close and open said fourth opening, said third and fourth valve means being of identical construction as that of the first and second valve means, characterized in that said adjustment means (47,50,51;75-77) is adapted to adjust the pivoted members (31;32;67,70) of the third and fourth valve means, such that the third opening (41) is closed when the fourth opening (38;62A) is uncovered and vice versa.

5. A milking pulsator according to claim 4, characterized in that the pivoted members (29, 30) of the first and second means are attached to a common shaft (44), and that the pivoted members (31, 32) of the third and fourth valve means are attached to a further common shaft (45).

6. A milking pulsator according to claim 5, characterized in that said adjustment means comprises a separate motor (46) for turning said common shaft (44) back and forth, and a further separate motor (47) for turning said further common shaft (45) back and forth.

7. A milking pulsator according to claim 4, characterized in that all of the pivoted members (67, 70, 72) of the valve means are attached to a common shaft (74).

8. A milking pulsator according to claim 7, characterized in that said adjustment means comprises a motor (75) for turning said common shaft (74) back and forth.

9. A milking pulsator according to claim 1, in which flow channels are formed between the pivoted members (29-32; 67, 70, 72) of the valve means and the housing (12; 54), characterized in that the pivoted member of at least one of the valve means is provided with an entrainment member (52), which is arranged such that it extends into and is displaced in the flow channel between the pivoted member and the housing during at least a substantial part of the turning of the pivoted member between said closing and opening positions, whereby the entrainment member is influenced by air flowing through the flow channel, as the membrane of the valve means uncovers its opening, and entrains the pivoted member towards the opening position of the valve means.

10. A milking pulsator according to claim 9, characterized in that each pivoted member is provided with said entrainment member (52).

11. A milking pulsator according to claim 9, characterized in that each pivoted member provided with said entrainment member (52) is connected to an electromagnetic stepping motor (46, 47) for said turning of the pivoted member, said electro-magnetic stepping motor being connected to an electric accumulator (48, 50) via a control means (49, 51), which is adapted to activate the electro-magnetic stepping motor for displacing the membrane of the pivoted member from said closing position, such that the membrane at least is displaced to the extent that the membrane starts to uncover the opening associated with the membrane, said control means also being adapted to control the electro-magnetic stepping motor, such that the latter operates as a generator for charging the electric accumulator during the entrainment of the pivoted member by the entrainment member.

* * * * *